United States Patent [19]

Ference et al.

[11] 4,050,986
[45] Sept. 27, 1977

[54] NUCLEAR REACTOR I

[75] Inventors: Edward W. Ference, Central City; John L. Houtman, Acme; Robert N. Waldby, New Stanton, all of Pa.

[73] Assignee: The United States of America as represented by the United States Energy Research and Development Administration, Washington, D.C.

[21] Appl. No.: 505,890

[22] Filed: Sept. 13, 1974

[51] Int. Cl.² .................. G21C 19/28; G21C 1/02
[52] U.S. Cl. .................................. 176/61; 176/40; 176/18; 176/87
[58] Field of Search ............... 176/36, 50, 61, 64, 176/78, 87, 40, 18

[56] References Cited

U.S. PATENT DOCUMENTS

| 3,158,543 | 11/1964 | Sherman et al. | 176/61 |
| 3,212,978 | 10/1965 | Short et al. | 176/61 |
| 3,324,006 | 6/1967 | Challender et al. | 176/36 R |
| 3,324,007 | 6/1967 | Baxter | 176/87 |
| 3,432,388 | 3/1969 | Fortescue | 176/78 |
| 3,481,832 | 12/1969 | Rickert | 176/86 R |
| 3,660,230 | 5/1972 | Bailey, Jr. et al. | 176/36 R |
| 3,791,466 | 2/1974 | Patterson et al. | 176/78 |
| 3,823,066 | 7/1974 | Thome | 176/87 |
| 3,849,257 | 11/1974 | Bevilacqua | 176/87 |

OTHER PUBLICATIONS

PMC-74-01, (1/74) pp. 89-90.

Primary Examiner—Samuel W. Engle
Assistant Examiner—S. A. Cangialosi
Attorney, Agent, or Firm—Edward L. Levine; Z. L. Dermer

[57] ABSTRACT

A nuclear reactor, particularly a liquid-metal breeder reactor whose upper internals include provision for channeling the liquid metal flowing from the core-component assemblies to the outlet plenum in vertical paths in direction generally along the direction of the respective assemblies. The metal is channeled by chimneys, each secured to, and extending from, a grid through whose openings the metal emitted by a plurality of core-component assemblies encompassed by the grid flows. To reduce the stresses resulting from structural interaction, or the transmissive of thermal strains due to large temperature differences in the liquid metal emitted from neighboring core-component assemblies, throughout the chimneys and the other components of the upper internals, the grids and the chimneys are supported from the heat plate and the core barrel by support columns (double portal support) which are secured to the head plate at the top and to a member, which supports the grids and is keyed to the core barrel, at the bottom.

In addition to being restrained from lateral flow by the chimneys, the liquid metal is also restrained from flowing laterally by a peripheral seal around the top of the core. This seal limits the flow rate of liquid metal, which may be sharply cooled during a scram, to the outlet nozzles.

The chimneys and the grids are formed of a highly-refractory, high corrosion-resistant nickel-chromium-iron alloy which can withstand the stresses produced by temperature differences in the liquid metal. The chimneys are supported by pairs of plates, each pair held together by hollow stubs coaxial with, and encircling, the chimneys. The plates and stubs are a welded structure but, in the interest of economy, are composed of stainless steel which is not weld compatible with the refractory metal. The chimneys and stubs are secured together by shells of another nickel-chromium-iron alloy which is weld compatible with, and is welded to, the stubs and has about the same coefficient of expansion as the highly-refractory, high corrosion-resistant alloy.

5 Claims, 25 Drawing Figures

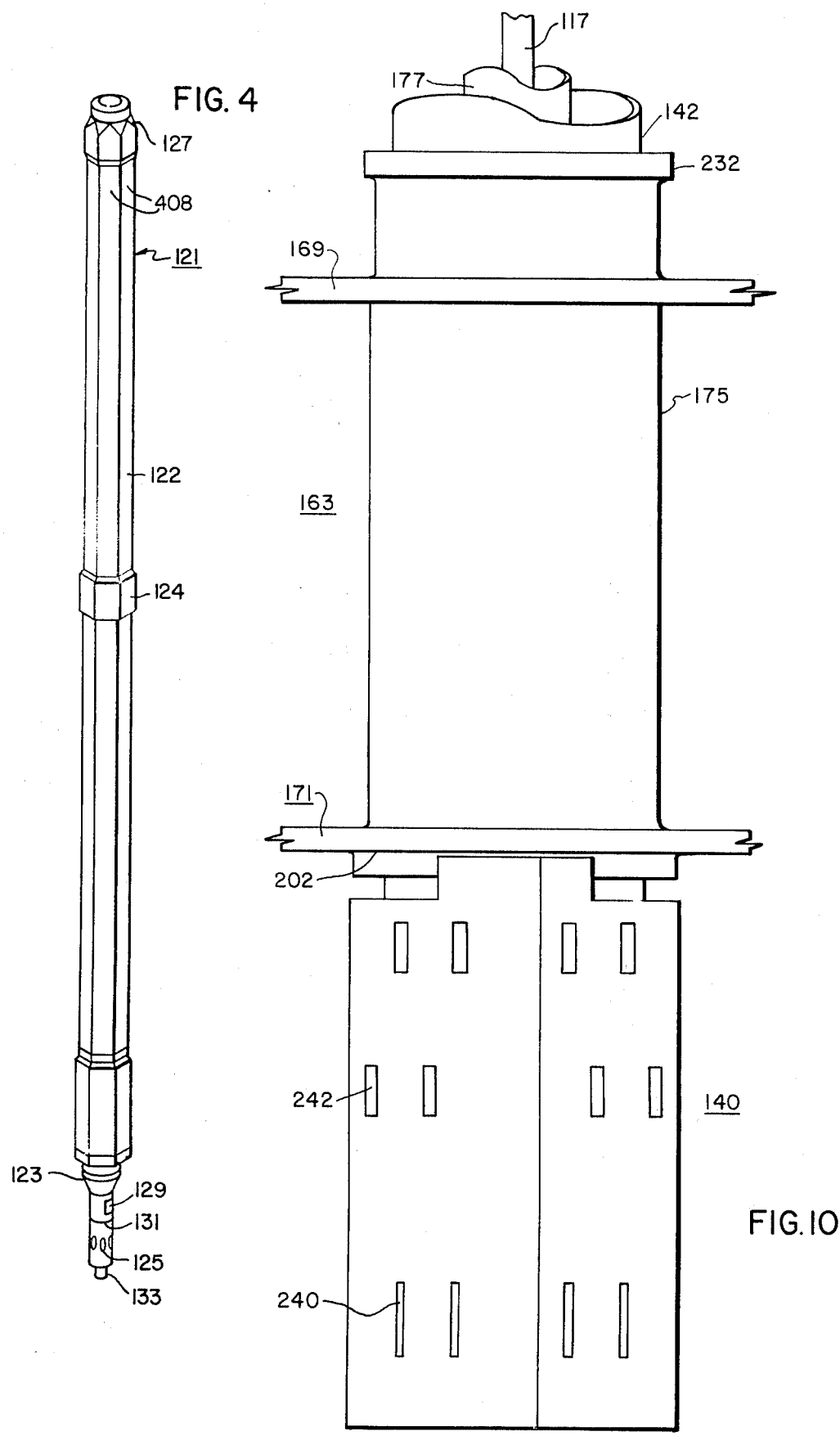

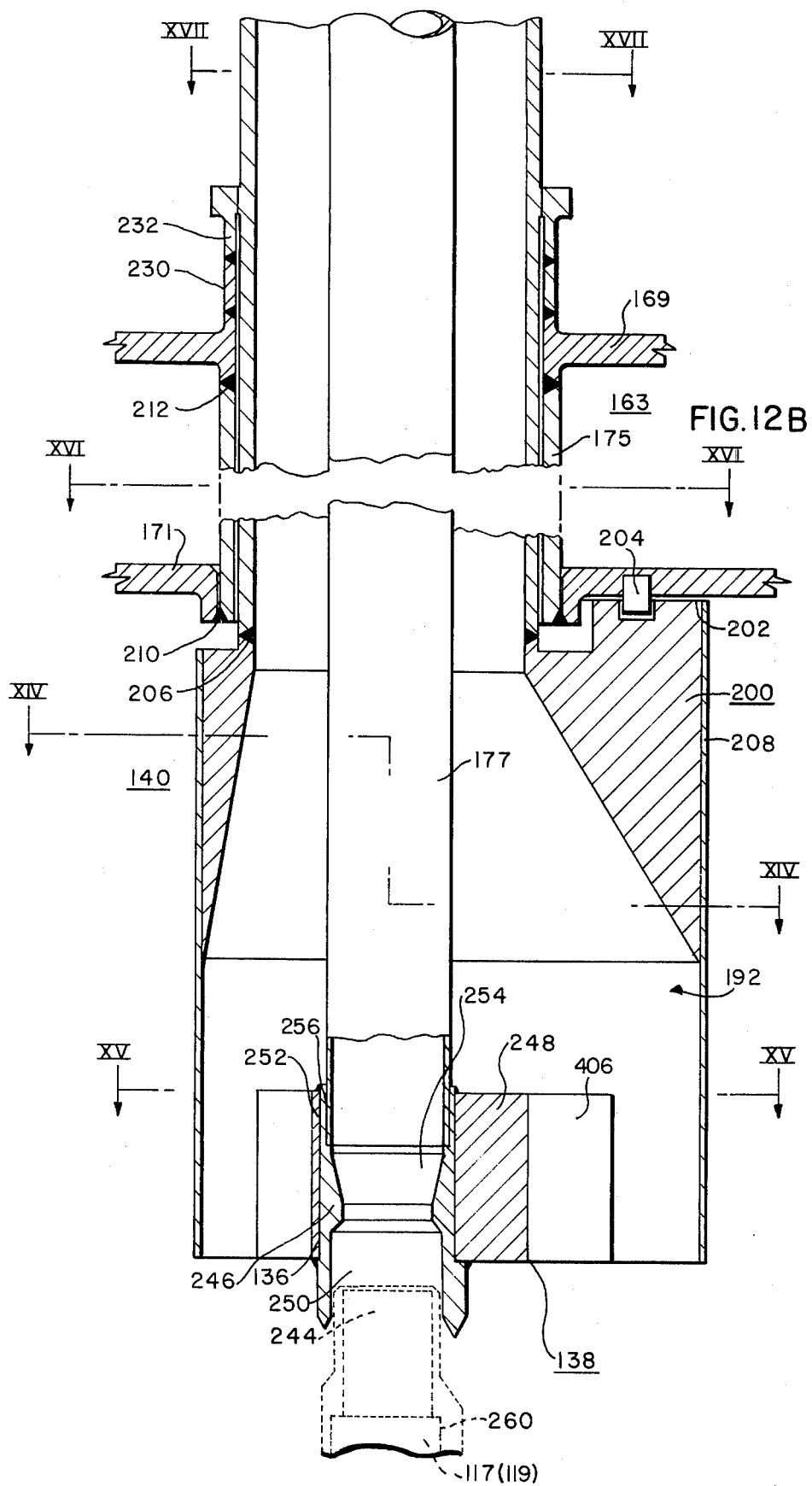

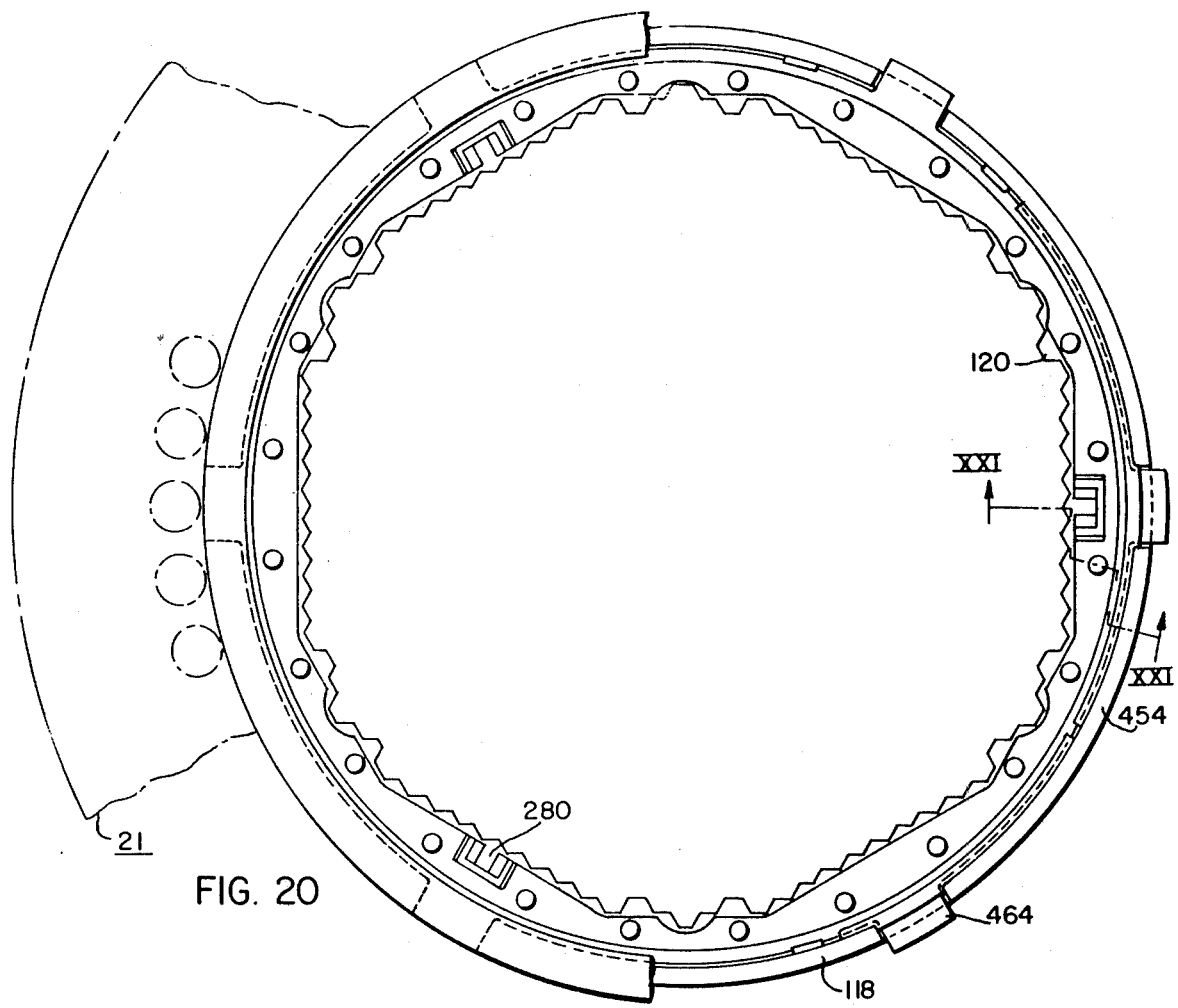
FIG. 20
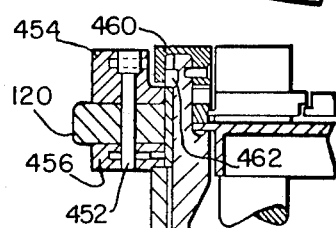
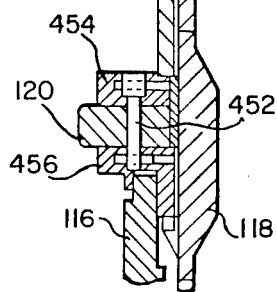
FIG. 21

NUCLEAR REACTOR I

This invention was made in the course of, or under, a contract with the United States Energy Research and Development Administration, successor in interest to the United States tomic Energy Commission.

CROSS REFERENCE TO RELATED APPLICATIONS

This application relates to, and incorporates by reference, each of the following applications, all asigned to Westinghouse Electric Corporation:
1. Application Ser. No. 503,148 filed Sept. 4, 1974 to W. E. Pennell and W. J. Rowan (herein called Pennell application) for Nuclear Reactor.
2. Application Ser. No. 503,149 filed Sept. 4, 1974 to John A. Rylat (herein called Rylatt application) for Nuclear Reactor.
3. Application Ser. No. 505,891 filed Sept. 13, 1974 to H. W. Yant, K. Stincher and G. C. Anzar (herein called Yant application) for Nuclear Reactor.

BACKGROUND OF THE INVENTION

This invention relates to the art of nuclear reactors and has particular relationship to the upper-internals structure of nuclear reactors. A nuclear reactor includes a pressure vessel into which a heat-transfer fluid, typically liquid sodium for fast breeder reactors, or pressurized or boiling water for more conventional commercial reactors, is pumped under pressure. The fluid flows through the core and is heated; the hot fluid emerges from the vessel and the heat flows via mechanically separated primary and secondary loops to electrical-power generating equipment. Within the vessel there is supporting structure for the core components. Typically, for a liquid-metal-cooled fast breeder nuclear reactor which generates more fissile fule than it burns up, these components include fuel-rod bundles or assemblies, control-rod assemblies, blanket fertile-material or fertile-rod assemblies and removable radial shielding assemblies. The expression "core assemblies" or "core component assemblies" or the word "assembly", when used in this application with reference to components of the core, means one or more types of these assemblies. The core-support structure serves the purposes of locating, supporting, distributing coolant to, and providing axial and radial restraint for, these assemblies.

The core component assemblies, which in the illustrated embodiment include fuel assemblies, both fissile and fertile fuel containing types, control-rod assemblies and shielding assemblies, which form the core of a liquid metal cooled fast breeder nuclear reactor, are separately supported in inlet-support modules or modular units. Each inlet-support modular unit is removably mounted, held only by gravity, in liners in the lower core-support structure with fluid seals interposed between the aligned fluid inlet openings in the module and liner and the upper and lower parts of the module and liner. Each module directs flow of the heat-transfer or coolant fluid to a plurality (typically 7) of reactor component assemblies which are removably mounted, held only by gravity, in receptacles of the corresponding modular unit. Below the seal each module is subjected to low pressure which balances the low pressure in the region where the fluid emerges from the core components. The low pressure in the volume below the module lower seal is generated and maintained by venting this volume to the low pressure regions of the vessel of the reactor. Gravity is adequate to hold the modules in the liner.

Typically, this invention applies to a 975 Megawatts-thermal, 400 Mwt-electrical (Mwt.) liquid-metal cooled fast breeder reactor which has 198 hexagonal-core fuel assemblies surrounded by 150 radial blanket assemblies and 324 radial shield assemblies. In this typical reactor the assemblies are received in 61 inlet modules each having 7 receptacles. The velocity of the heat-transfer or cooling fluid, which is sodium, and its distribution varies with the character of the component or assembly which it cools. The velociyt is about 30 feet per second in non-replaceable components while in replaceable components it may be as high as 50 feet per second at the inlet-lower-temperatures end and 40 feet per second at the outlet-higher-temperature end. In the fuel rod bundles it is 25 feet per second. Eighty percent of the fluid is allocated to the core, 12% to the radial blanket, 1.6% to control assemblies, and the remainder to shielding, bypass and leakage.

Typically a reactor of the type to which to which this invention relates, for example, a sodium-cooled breeder reactor, operates at a bulk coolant temperature differential of 300F° or greater between the core inlet and core outlet. This temperature gradient is not uniform across the core; it fluctuates widely and has peaks in temperature throughout the core caused by core geometry, fuel "Burnup," and deliberate variations in fuel enrichment. Localized temperature variations may also occur by reason of local anomalies in the core such as control assemblies. Also typically, a sodium-cooled breeder reactor undergoes rapid and severe changes in the core outlet temperature because of rapid changes in power load-level during postulated 'upset' events such as reactor trips, rapid unloading, etc.

The structure within the reactor vessel above the core, variously called instrument trees, upper core support structures, or upper-internals structure, or upper internals as it is called in this application, provide primary or secondary 'holddown' of the reactor core for the contingency that the gravity holddown fails during emergencies such as scram, and support control-rod drivelines and instrumentation. These upper internals are exposed to the core effluent flow, thermal gradients, thermal transient conditions and periodic "stripping" of hot and cold coolant streams. The word "stripping" means the overlap in temperature which occurs between adjacent parts of a reactor, for example adjacent core-component assemblies, which operate at widely different temperatures. The resulting thermal stress and thermal fatigue may reduce the design lifetime of upper-internals structures, which are normally designed for a lifetime equal to that of the reactor itself.

To assure a reasonable or long lifetime for a reactor, the core-outlet liquid-metal flow streams are mixed as they are delivered at the core outlet. This mixing reduces thermal gradients between flow streams at widely different temperatures and isolates the remaining structure of the upper internals from direct impingement by the flow streams, reducing the rate of change for thermal transient events. The mixing is effected by outlet modules, each outlet module serving a plurality of core-component assemblies. These outlet modules collect effluent coolant from the core assemblies and duct it through the above core structure to the reactor outlet plenum. Each outlet module includes a support or 'holddown' grid, a flow collector, a chimney, and thermal liners or stubs isolating each chimney from the other upper internals. The support grid is designed to avoid direct impingement of core effluent streams on neighboring parts of the upper internals and it limits the axial travel of the core assemblies below it, thus serving as "holddown" grid.

Core effluent is ducted from the flow collector of each outlet module through the upper internals by the chimneys. Each chimney and its thermal liners protect the upper core support structure from high cycle thermal transients. Flow mixing within the collector and chimney mix hot and cold streams entering the module, providing more even radial gradients between chimneys. The thermal isolation between chimney and 'structure' reduces the severity in rate of change for thermal transients due to core power-level changes. It has been found that the mixing of high and low temperature jets of the liquid from the core starts immediately above the core and continues for some distance downstream towards the outlet plenum. Temperatures in these flow streams differ substantially and the mixing of these streams near the inner portion of the outlet modules results in a number of thermal stripping transients. The material selected for the modules must therefore have an endurance limit stress in excess of the maximum anticipated stress amplitude produced by fluid mixing. The part of the outlet module assembly which is subjected to these sharp temperature fluctuations is fabricated from alloys with superior cyclic thermal stress characteristics, while the remainder of the structure is made of relatively inexpensive material.

Typically the part of the assembly which is subject to sharp temperature variations is fabricated from the refractory corrosion-resistant nickel-chromium-iron alloy,, INCONEL-718, and the other parts are fabricated from AISI-304 or 316 stainless steel. INCONEL-718 has the following typical composition:

| Nickel | 50.00 – 55.00 |
| --- | --- |
| Chromium | 17.00 – 21.00 |
| Columbium (plus Tantalum) | 4.75 – 5.50 |
| Molybdenum | 2.80 – 3.30 |
| Titanium | 0.65 – 1.15 |
| Aluminum | 0.20 – 0.80 |
| Cobalt | 1.00 Max. |
| Carbon | 0.08 Max. |
| Manganese | 0.35 Max. |
| Silicon | 0.35 Max. |
| Phosphorus | 0.015 Max. |
| Sulfur | 0.015 Max. |
| Boron | 0.006 Max. |
| Copper | 0.30 Max. |
| Iron | Balance |

The 304 stainless steel has the following composition:

| Carbon | 0.08% Max. |
| --- | --- |
| Manganese | 2.00% Max. |
| Phosphorus | 0.040% Max. |
| Sulphur | 0.030% Max. |
| Silicon | 1.00% Max. |
| Nickel | 8.00 – 11.00% |
| Chromium | 18.00 – 20.00% |
| Iron | Balance |

The 316 stainless steel has the following composition:

| Carbon | 0.08% Max. |
| --- | --- |
| Manganese | 2.00% Max. |
| Phosphorus | 0.040% Max. |
| Sulphur | 0.030% Max. |
| Silicon | 1.00% Max. |
| Nickel | 10.00 – 14.00 |
| Chromium | 16.00 – 18.00 |
| Molybdenum | 2.00 – 3.00 |
| Iron | Balance |

The cobalt in these alloys and the cobalt and tantalum in the 718 are restricted for use within a reactor vessel. The cobalt and/or tantalum limit is a function of the neutron flux at the location of the material, surface area exposed to primary coolant, velocity of coolant past the exposed area, and the residence time of the material within the reactor vessel. The 718 is not weld compatible with either stainless steel.

Even with the chimneys localized temperature variations occur. Sodium streams, exiting from the chimneys at significantly differing temperatures, mix in the outlet plenum imposing fluctuating temperatures on the surface material of the upper internals. During the scram transient, the section of the upper internals immersed in the sodium or other liquid pool is subjected to a very rapid drop in surface temperature because the control rods are fully inserted in the core. Jet impingement forces from the core outlet flow, and upper plenum cross flow forces are both unsteady, and tend to produce flow induced vibration of the upper internals structure. It has been found that this structure must have adequate structural stiffness. In providing the required stiffness the problem is confronted that only structural configurations which will perform satisfactorily in an ill defined thermal environment can be used.

It has been proposed that the necessary stiffness be achieved by providing a cross-braced frame configuration between the columns in the area below the head plate and the tops of the chimneys. This proposal has proved unsatisfactory because of its sensitivity to thermal inertia matching of the structural members. The expression "thermal inertia" means the facility of a structure to resist temperature change produced by thermal gradients. Structures having higher moments of inertia transmit thermal strains more readily than structures having lower moments of inertia. For example, a corrugated plate transmits thermal strains more readily than an equivalent flat plate. It is essential that any structural member take up the strain arising from the stresses by its flexibility rather than transmitting the strain.

Effective utilization of the reactor vessel outlet plenum mixing volume is essential for mitigation of the transients experienced by the reactor vessel and all the hot leg components. The natural flow characteristics in the outlet plenum assures this to an extent but difficulties are encountered in the case of a scram transient. Stratification of the cool core effluent following a scram have led to concerns that adequate outlet plenum mixing may not occur unless forced. The upper-internals structure outlet-module chimneys provide a means for forcing the required mixing by ensuring that a major portion of the core effluent exits into the plenum at a high elevation. However, a serious problem is presented in fabrication of the complete structure including the chimneys because the highly refractory, high corrosive resistant nickel-chromium alloy of which the chimneys are composed, to be able to withstand the stresses, cannot be joined to the remainder of the structure by welding.

It is an object of this invention to overcome the above-described disadvantages of the prior art and to provide a nuclear reactor in which the upper internals including the chimneys shall have the necessary stiffness without being sensitive to thermal inertia matching. It is also an object of this invention to provide an unwelded assembly including the chimneys and their associated structure which shall maintain its integrity in the face of the violent wide temperature fluctuations to which it is subject in use. It is a further object of this invention to suppress the effects of the temperature changes in the coolant during emergencies and particularly during scram.

SUMMARY OF THE INVENTION

It has been realized in arriving at this invention that the main load-bearing structure, which, in the interest of economy, is composed of stainless steel, must be stiff to suppress flow-induced vibrations and must be light to minimize thermal stress in the non-isothermal environment. It has also been realized that the thermal inertia of the individual structural members must be low to maintain within permissible limits cumulative creep-fatigue damage with appropriate modification for carbon and nitrogen depletion. Typically uniform plate thicknesses should not exceed one inch and this thickness is reduced at the junction between members.

In accordance with this invention, the main load bearing structure for the assembly including the chimneys is a welded sandwich plate assembly. This assembly includes a plurality of pairs of plates, typically of 316 stainless steel. The shear web for each pair of plates is made by welded stub tubes which surround each of the outlet module chimney penetrations. The shear web so made is not continuous, but the unsupported span between shear webs is sufficiently short that the secondary bending moments induced in the top and bottom plates of each pair are small. The sandwich plate assembly including the grids and the chimneys is supported from the columns which are secured to the head plate at the top and are keyed to the core barrel at the bottom. This double-portal (there are two pairs of columns) frame configuration derives its stiffness through bending of the frame members; i.e., the columns, and is structurally insensitive to differences in bulk temperature of the various major structural members. Core seismic or loss of hydraulic holddown loads are transmitted directly to the upper plate of the pairs via the outlet module chimneys. The plates are of sufficient strength to provide the required strength for the upper internals to survive undamaged an operational basis earthquake with the locating keys in the core barrel disengaged. The upper internals are movable to different positions within the reactor vessel by the rotatable plugs in the head. When the upper internals are to be moved the key is with the upper internals raised to disengage from the keyway.

To suppress flow-induced vibration, a close tolerance fit at operating temperature is required at the connection between each nickel-chromium-iron chimney and the stainless steel structure. To accomplish this object an extension of another nickel-chromium-iron alloy which is weld compatible with the stainless steel (typically 316) and has about the same thermal coefficient of expansion as the highly refractory nickel-chromium-iron alloy is welded to the stainless steel. Typically this other nickel-chromium-iron alloy is INCONEL-600 which has the following composition:

| | |
|---|---|
| Nickel plus Cobalt | 72.0 Min |
| Chromium | 14.0 – 17.0 |
| Iron | 6.0 – 10.0 |
| Carbon | 0.15 Max. |
| Manganese | 1.00 Max. |
| Sulphur | 0.015 Max. |
| Silicon | 0.50 Max. |
| Copper | 0.50 Max. |

In the above alloy the cobalt should be limited to 0.10% where, as here, the alloy is to be used within a reactor. The weld of the extension to the plates is made at a sufficient distance from the plate to reduce local bending moments at operating temperature to an acceptable level. The extension at the top end of the chimney carries the lateral and vertical load from the top end of the chimney. A lateral load pad is provided at the upper one of the lower pair of plates. Up load on the chimney is carried to the stainless steel structure by a ledge and down load is carried by the split key. Both the ledge and the key are at the upper plate of the upper pair. A locking band holds the key in place. A thermal liner is held in place by the locking band. The unique feature of this structure is that the joint can carry lateral and vertical (up and down) loads from the chimney to the stainless steel structure (materials with different rates of thermal expansion and materials that cannot be welded) without creating large gaps at operating temperature.

To suppress lateral flow of the coolant to the vessel walls and through the outlet nozzles a peripheral seal is provided at the upper end of the core over the shielding assemblies of the core. This seal consists of highly-refractory alloy members (typically INCONEL-718). This seal is positioned over the removable shielding assemblies. To fit over these assemblies the seal is formed of parts with matching edges which are in engagement like a jig-saw puzzle. Because the seal is made in this form rather than a cylinder adjacent the core barrel the radius over which the upper internals, including the seal, must be swung is reduced and the diameter of the pressure vessel may be correspondingly reduced.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 4 is a view in side elevation showing a fuel-rod assembly;

FIG. 10 is a view in side elevation as seen from direction X—X of FIG. 13 of an outlet module in the reactor shown in FIGS. 1A and 1B;

FIGS. 12A and 12B together are a view in longitudinal section taken along line XII—XII of FIG. 13;

FIG. 20 is a plan view of the core barrel, core former ring and the keyways for the keys connecting the upper internals to the core barrel; and FIG. 21 is a view in section taken along line XXI—XXI of FIG. 20.

Figure 1A:
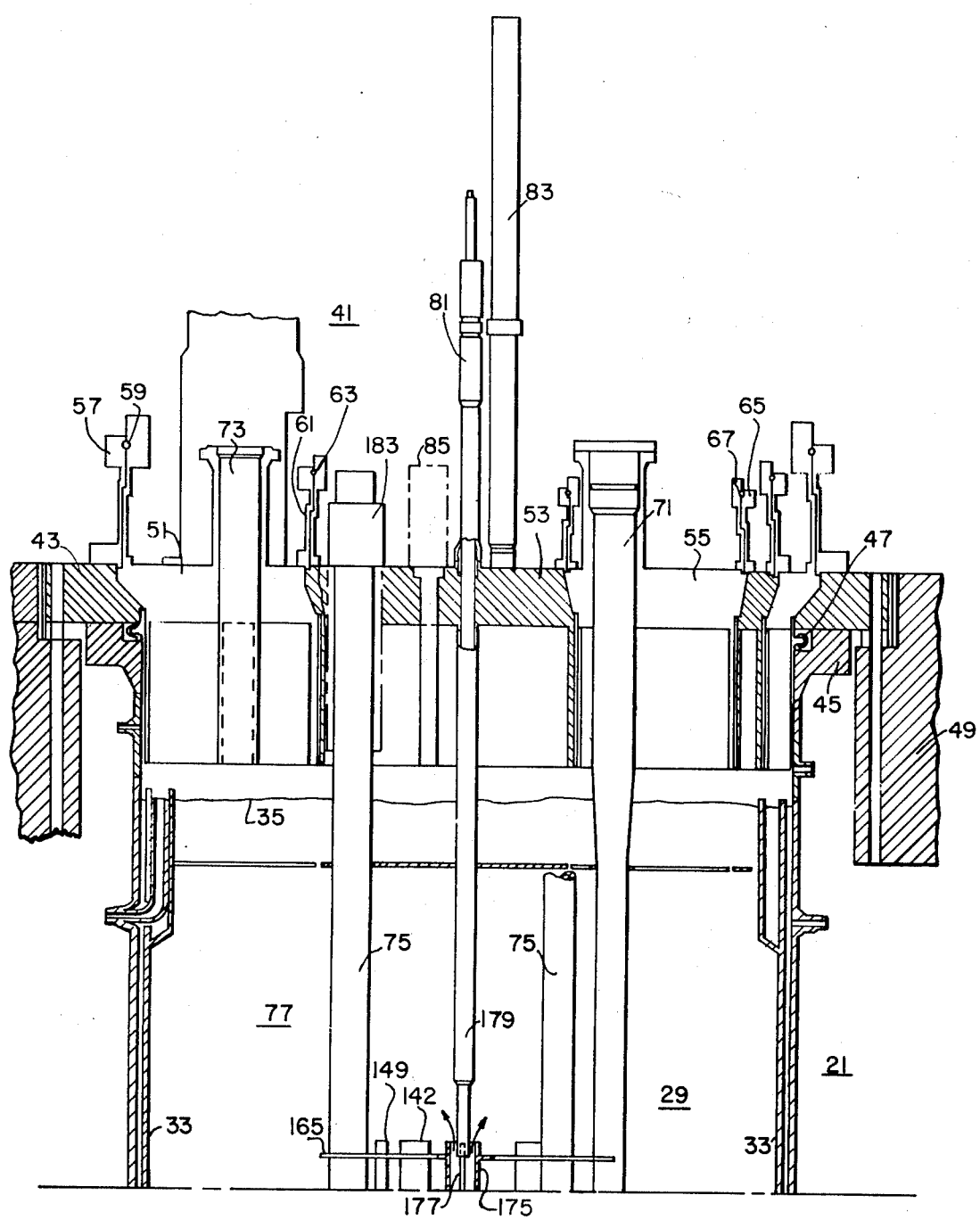
FIG. 1A and 1B together are a view in longitudinal section (or a view in elevation with the vessel open) of a nuclear reactor in accordance with this invention.
Figure 1B:
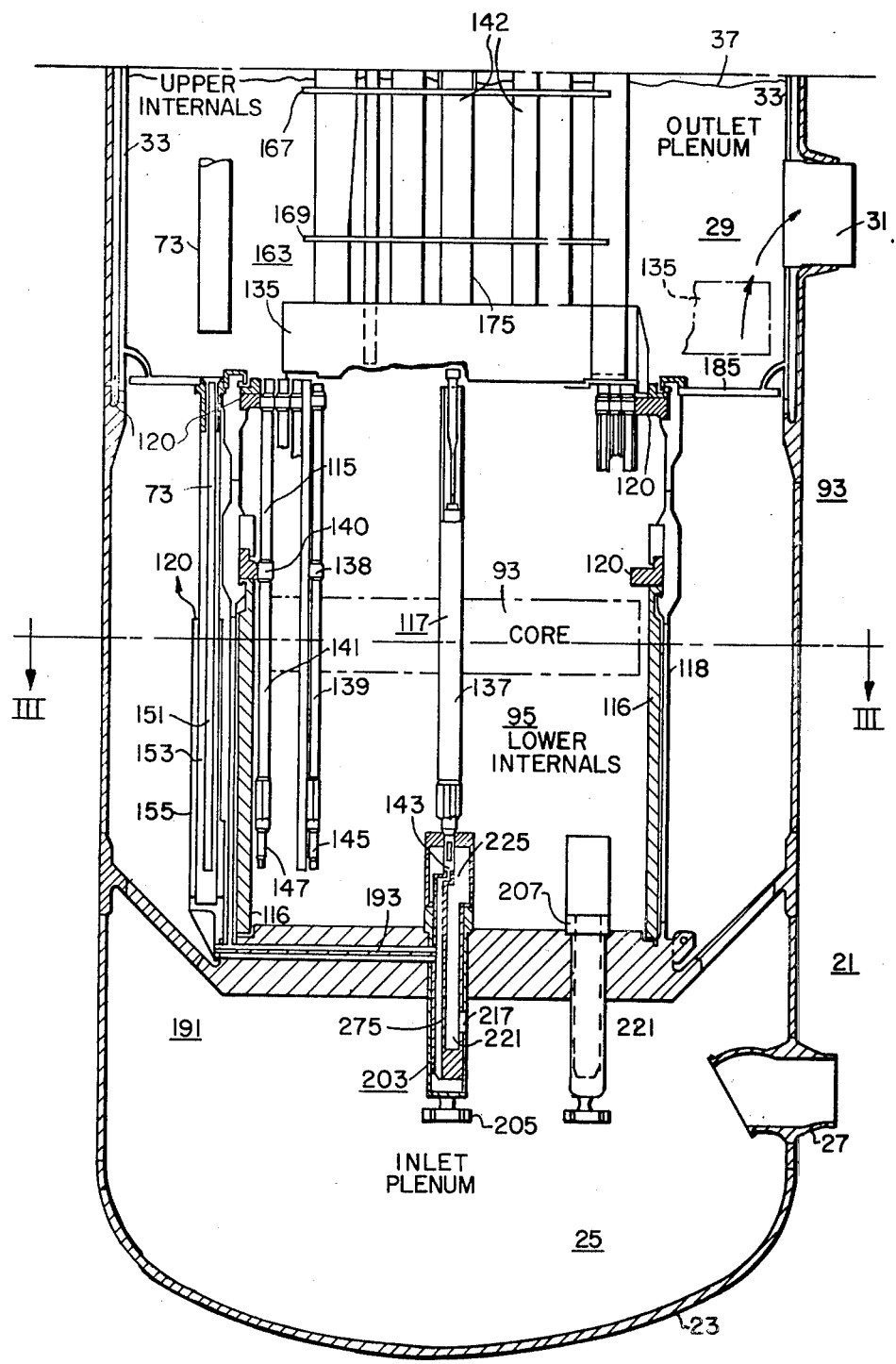

The reactor shown in the drawings includes a generally cylindrical pressure vessel 21 (FIGS. 1A and B) closed at the bottom by a bell 23 which bounds an inlet plenum 25. The vessel 21 has a plurality of inlet nozzles 27 above the bell 23 through which a heat-transfer or cooling fluid such as liquid sodium is supplied to the plenum 25 under pressure. The vessel 21 has an outlet plenum 29 from which the hot fluid is derived through a plurality of outlet nozzles 31. The vessel is provided with a thermal liner 33 encircling the outlet plenum 29 and the regions above and below the outlet plenum. The permissible upper level and the minumum safe lower level of the fluid are indicated in FIGS. 1A and 1B by wavy lines 35 and 37 respectively. Above the surface (37) of the fluid there is an inert gas such as argon at low positive differential gauge pressure above atmospheric pressure (about 2 or 3 inches of water).

At the top the vessel 21 is closed by a head 41. The head 41 has a stationary outer ring 43 which is bolted to a flange 45 of the vessel 21. The joint of the ring 43 and flange 45 is sealed internally (of the bolts not shown) by an omega seal 47. The vessel 21 is supported on a support ledge 49 of a concrete containment. The ring 43 is bolted to the ledge 49. The head 41 has a plurality of rotating plugs 51, 53, 55 which are sealed to prevent leakage of the reactor cover gas to the containment building atmosphere. Plug 51, of largest diameter, is coaxial with the vessel. The stationary ring 43 supports the plug 51 through an annular riser 57 and a bearing 59 (FIG. 1). Plug 53, of intermediate diameter, and plug 55, of smallest diameter, are eccentric to the axis of the vessel 21. Plug 51 supports plug 53 through an annular riser 61 and a bearing 63 and plug 53 supports plug 55 through an annular riser 65 and a bearing 67. The risers 57, 61 and 65 are cylindrical extensions above the periphery of the stationary 43, the plug 51 and the plug 53. The risers 57, 61, 65 serve to mount the bearings 59, 63, 67, pressure seals (not shown) for the plugs and part of the gearing (not shown) for driving the plugs. The rotating plugs 51, 53, 55 position the fuel and control handling equipment over all core assembly locations.

Figure 2:
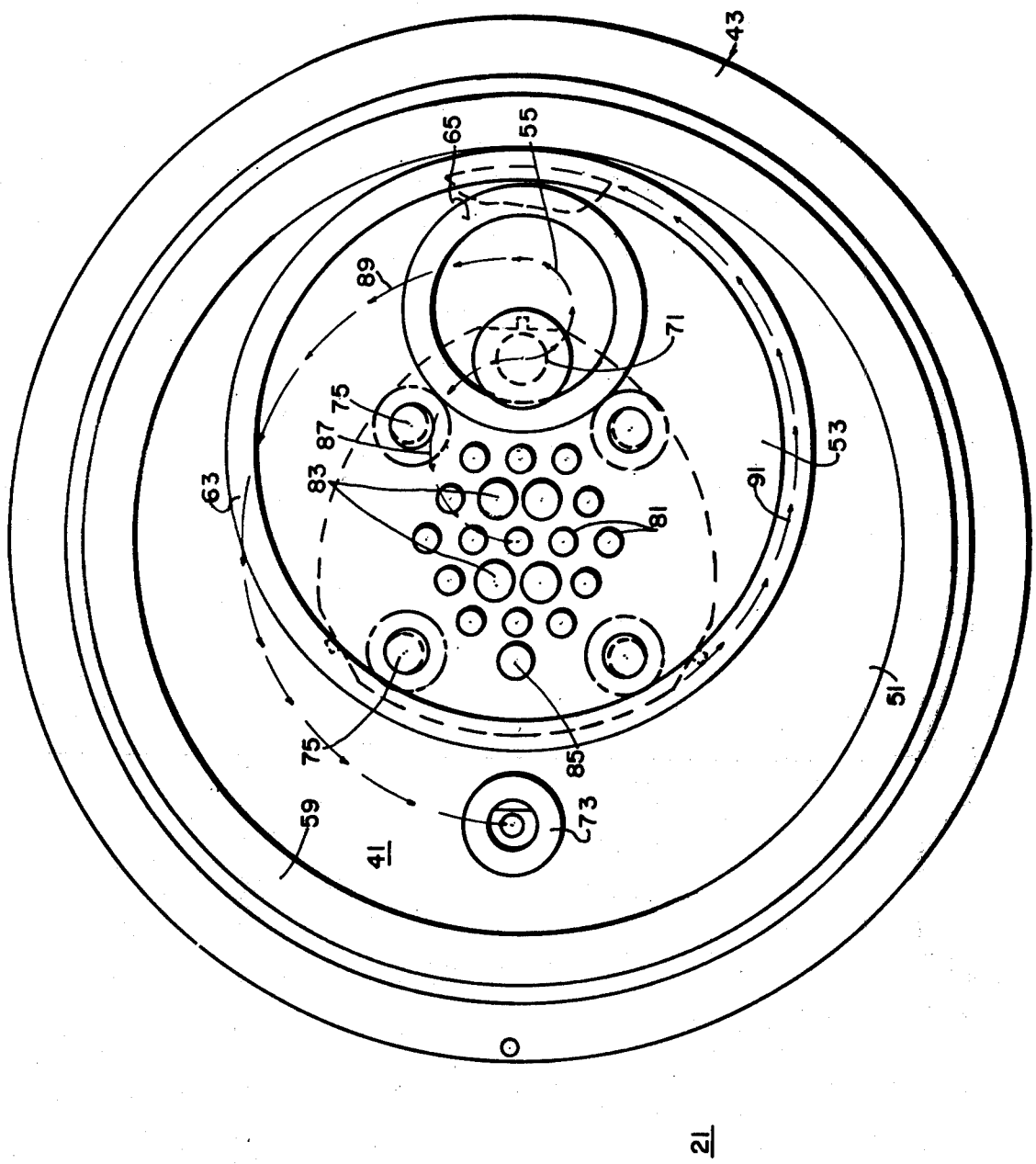
FIG. 2 is a plan view of the top of the reactor shown in FIG. 1.
Figure 3:
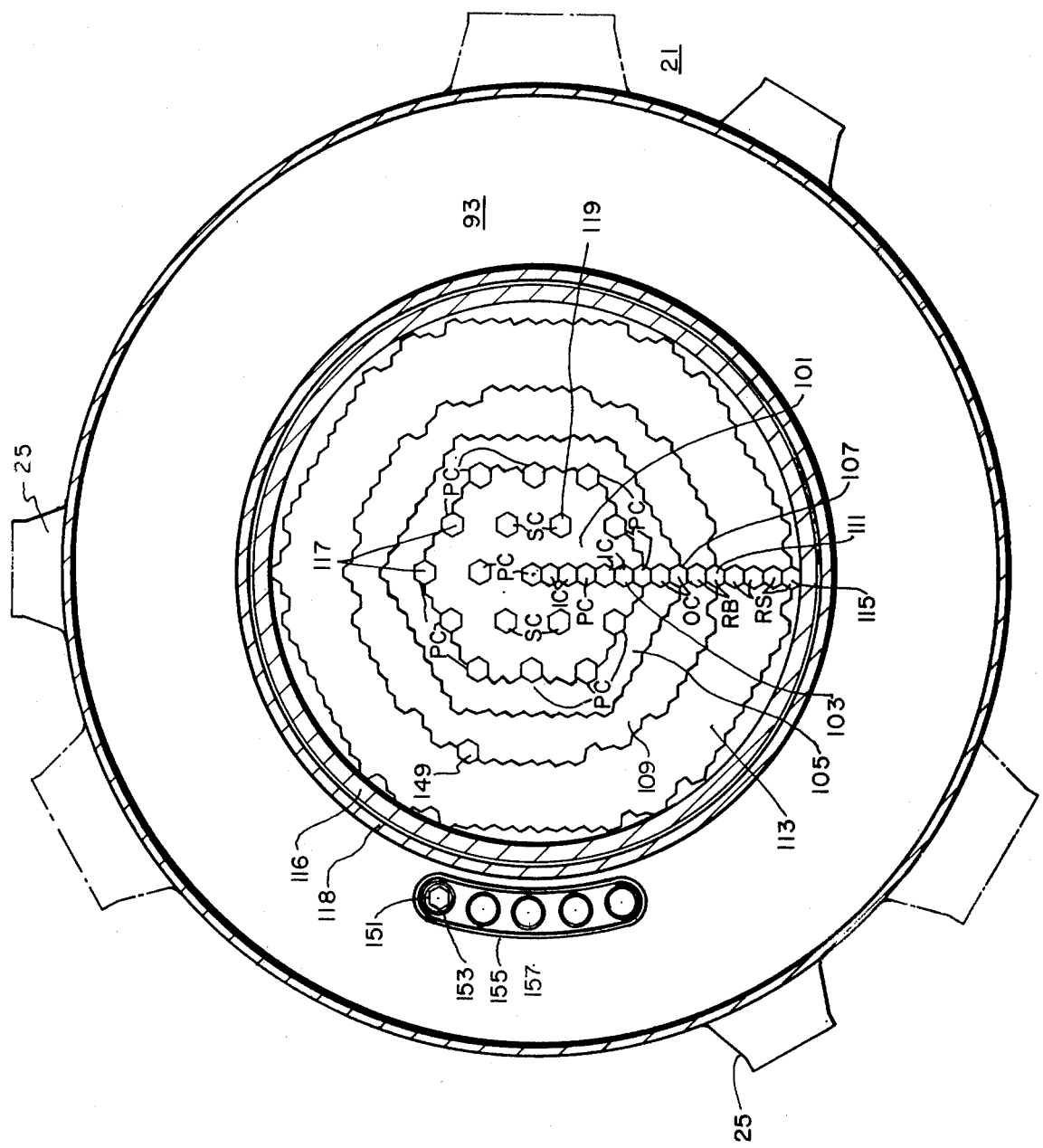
FIG. 3 is a view in transverse section taken along line III—III of FIG. 1 showing the core components.

The plug 55 supports an in-vessel transfer machine port 71 eccentrically. The plug 51 supports the ex-vessel transfer machine port 73 eccentrically. The plug 53 supports columns 75 which support the upper internals 77, the primary control-rod assembly drive mechanisms 81, the auxiliary control-rod drive mechanism 83, and one or more sealed serveillance ports 85. By rotating the plugs 51, 53, 55, the in-vessel transfer machine port 71 can be positioned over the various components within the vessel as shown by the arrows 87 (FIG. 2) and over the ex-vessel transfer machine port 73 as shown by the arrows 89. During the rotation of plug 53, the column 75, the control-assembly drives 81 and 83 and the port 85 are rotated as shown by the arrows 91. When the plugs 51, 53, 55 are to be rotated, the upper internals 77 are raised and the drives 81 and 83 are disconnected from the driven parts. Jacks (not shown) are provided for raising the upper internals. Typically, the in-vessel transfer machine port 81 is positioned over the fuel transfer ports after the plugs 51, 53, 55 are each rotated through 180°.

Figure 19:
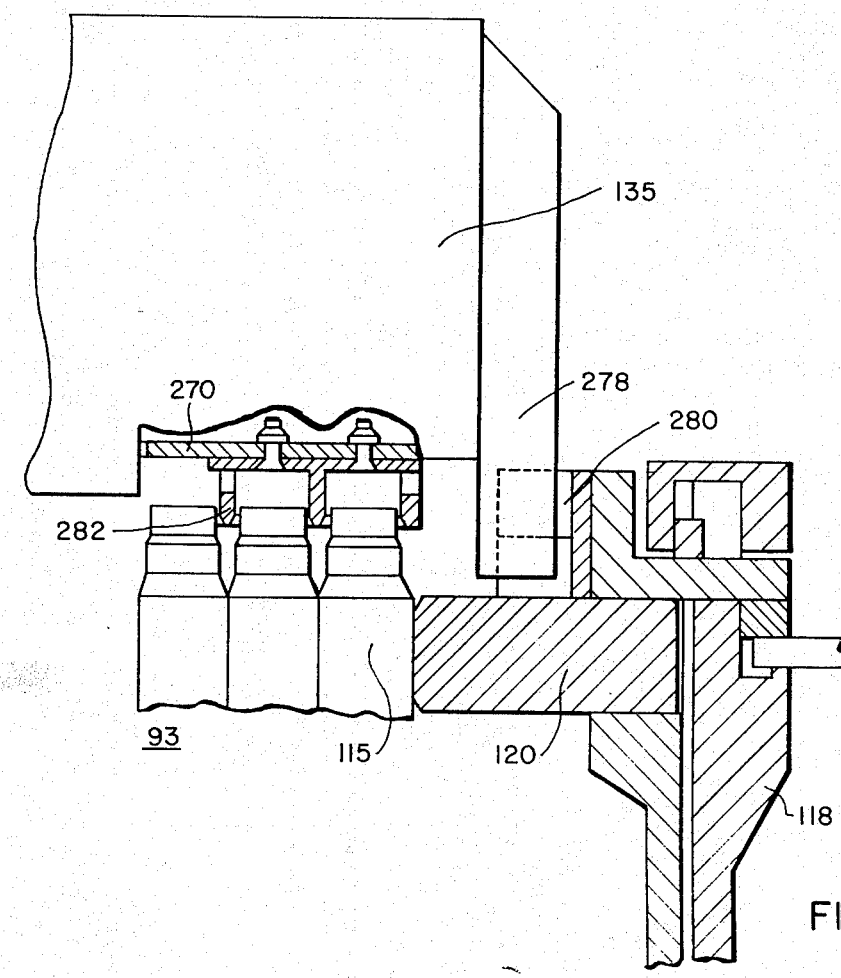
FIG. 19 is a view in section taken along lines XIX—XIX of FIG. 18.
Figure 18:
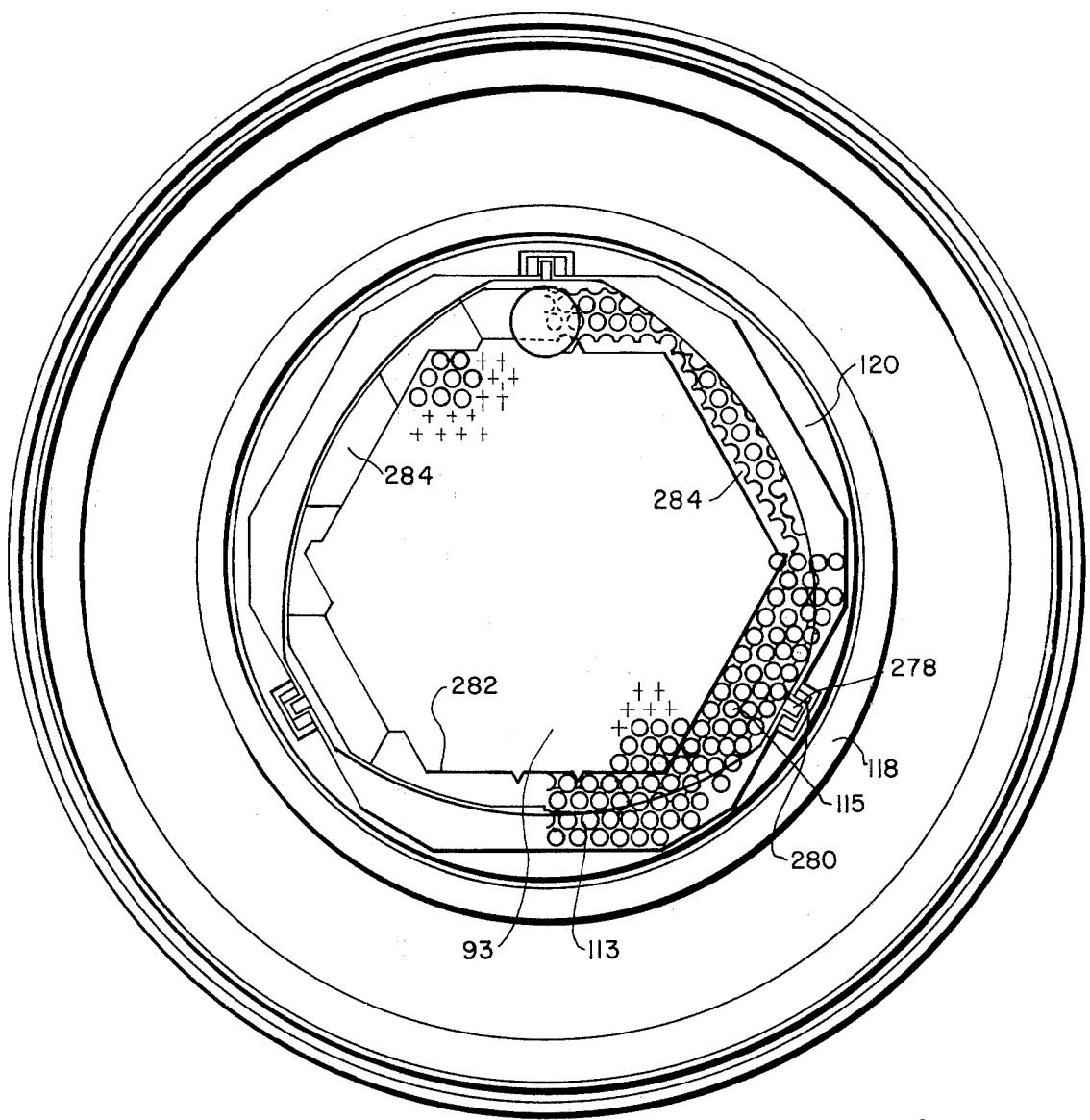
FIG. 18 is a plan view of the portion of reactor shown in FIGS. 1A and 1B just above the core showing the peripheral seal.

Within the vessel 21 there are, in addition to the upper internals 77, the core 93 and the lower internals 95. The core includes an inner zone 101 of fuel assemblies 103 (typically 108 in number) of lower enrichment (typically 18.7%, labeled 1C) and an outer zone 105 of fuel assemblies 107 (typically 90) of higher enrichment (typically 27.1%, labeled OC). Around the zone 105 there is a radial blanket 109 of radial blanket assemblies 111 (typically 150, labeled RB). Around the zone 109 there is a zone 113 of removable radial shielding assemblies 115 labeled RS. About the removable shield 115 there is a fixed shield 116. The fixed shield is enclosed by a core barrel 118. Core restraint former rings 120 (FIGS. 20, 21) are provided spaced along the core 93 for restraining deformation of the core. The former rings 120 are formed in sections of arcs and are secured together by pins 452 between rings 454 and 456. The keyways 280 are secured to spacers 458 (FIG. 19) welded to the upper rings 454. The keyways 280 are in the form of slots into which the keys 278 slide. Since there are three keys and keyway pairs the upper internals 77 can only be moved vertically. A thermal shield 460 is provided over the upper end of the core barrel. This shield 460 holds in place shear rings 462 in slots on the core barrel. The shear rings 462 prevent the assembly 456, 120, 454 from moving vertically. The rings 454 have keys 464 which engage slots (not shown( in the core barrel.

The inner zone 101 includes, in addition to the fuel assemblies, primary control-rod assemblies 117 (typically 15 in number, labeled PC) and secondary control-rod assemblies 119 (typically 4 in number, labeled SC). The control-rod assembly drives 81 and 83 can be set so that the control-rod assemblies 117 are either completely removed or positioned at any axial position within the core 93. The lower and higher enrichments in the zones 101 and 105 promote uniform power generation across the core 93. Typically each fuel-rod assembly contains 217 fuel rods.

Figure 5A:
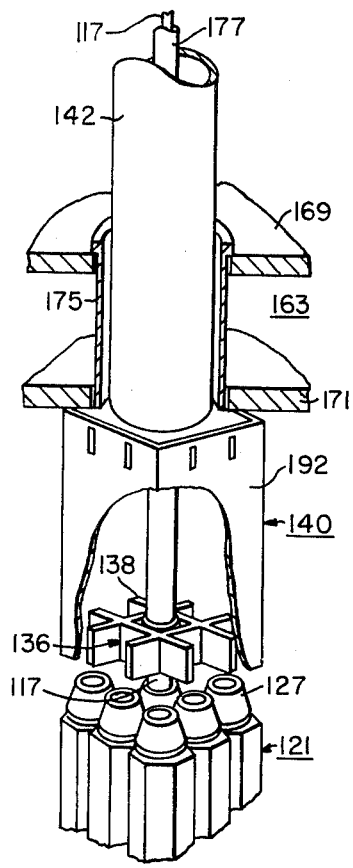
FIG. 5A is a fragmental diagrammatic view in perspective showing an outlet of the nuclear reactor shown in FIGS. 1A and 1B.
Figure 5:
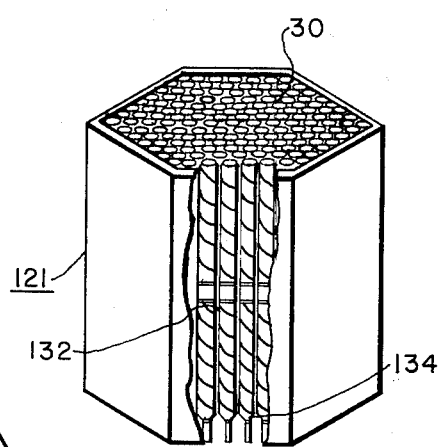
FIG. 5 is a fragmental view in perspective showing a cut-out section of the assembly shown in FIG. 4.
Figure 5B:
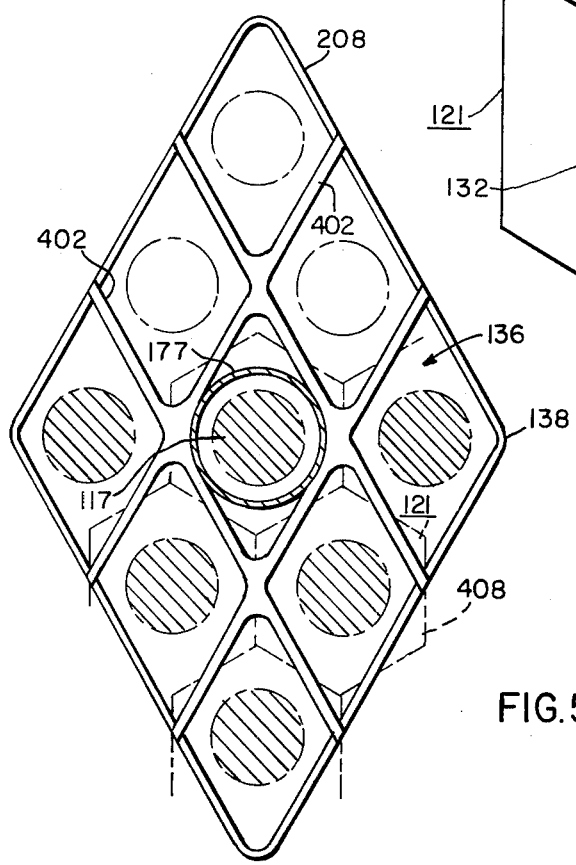
FIG. 5B is a diagrammatic view of the support or holddown grid of the outlet module shown in FIG. 5A.

The fuel rod bundle or assembly 130 (FIGS. 4 and 5) is contained within a thin-walled hexagonal duct 121 which serves to guide the heat-transfer fluid through the assembly and to protect the bundle during handling. The fuel pins have a plenum 122 above the fuel and axial fertile blanket sections for containing gaseous fission products. There is a core restraint load pad 124 intermediate the ends of the duct 121. The fuel rods 132 in bundle or assembly 130 are wrapped in wires 134 and are thus spaced by the wires. A rod attachment facility (not shown) is provided in the lower part of the duct 121 to provide for uniform flow distribution and axial restraint of the rods. The attachment sub-assembly rails mate with a keyhold slot in the bottom end-cap 123 of the duct in a discriminatory manner to prevent mixing of different enrichments. The duct 121 has an inlet nozzle 125 and an outlet nozzle 127. The inlet nozzle has lateral openings 129 through which fluid is admitted to the duct 121. Below this opening there is a circumferential slot 131 for a piston ring which seals the region below the opening 129 against fluid flow when the assembly is inserted in a socket. The duct may contain orifice plates (not shown) for controlling the flow of the fluid. At the end of inlet nozzle 125, there is a discrimination port 133 which assures that the fuel assembly 103 or 107 cannot be inserted in a control-assembly position. Each outlet nozzle 127 directs fluid flow through an aligned openin 136 (FIGS. 5A, 5B) in a holddown grid 138 of an associated outlet module 140 and thence through a chimney 142 to the outlet plenum 29. The grid 138, outlet module 140 and chimney constitute part of the upper internals 77.

The primary function of the radial-blanket assemblies 111 is to convert fertile material (typically depleted U-238) into fissile material (typically Pu) by neutron capture. A secondary function of assemblies 111 is to absorb and reflect neutrons from the fuel assemblies 103 and 107, thus to shield the structures outside of the blanket. The radial blanket assemblies 111 also generate energy. An operational feature of the radial blanket 109 is the facility for shuffling of the assemblies 111 from positions adjacent zone 105 to peripheral positions. Fresh fertile assemblies in the inner rows of the radial blanket 109 generate little energy because of the absence of fissionable material. As the fissionable material increases the generated energy increases. By moving the assemblies 111 to outer rows of blanket 109, the raising of the cladding to excessive temperatures beyond design limits is avoided. Shuffling of radial assemblies equalizes the energy generated in the radial blanket 109 and reduces radial temperature gradients. Typically shuffling of the assemblies 111 is performed annually during reflueling. The control-rod assemblies 117 and 119, the blanket assemblies 111 and radial-shielding assemblies 115 have ducts 137, 139, 141 of the same countour as the ducts 21 with core restraint load pads 336, 338, 340 and inlet nozzles 143, 145 and 147 as described above.

The core 93 includes a surveillance specimen 149 of adjacent the blanket 109 and another specimen 151 adjacent the barrel 118. The surveillance specimen 151 is encircled by flow guides 153 and 155. There are also fuel-transfer and storage containers 157 adjacent the barrel 118 and also encircled by flow guide 155.

The upper internals 77 function to:
 1. Provide a backup mechanical hold-down for the core 93 in the event of a malfunction of the core hydraulic hold-down system.
 2. Position, protect, guide and support the core instrumentation.
 3. Assure alignment of the control-assembly system under steady state and seismic conditions and protect the control-assembly drive line 179 from flow induced vibration.
 4. Control flow in the vessel outlet plenum 29 to minimize flow stratification during a scram transient.

The unique features of the upper internals 77 apparatus according to this invention are:
 1. Low thermal inertia. The upper internals is relatively insensitive to differences in bulk temperature of the members 75, 136, 138, 140, 142 which make it up.
 2. The mechanical attachment of the top end of the chimney 142, which is composed of highly refractory nickel-chromium alloy, to the adjacent structure which is predominately composed of stainless steel.
 3. The peripheral seal. This is a low-pressure hydraulic seal which forces or directs the bulk of the coolant up the chimneys 142 to the outlet plenum 29 and in addition acts as a back-up core bundling device.

Figure 7:
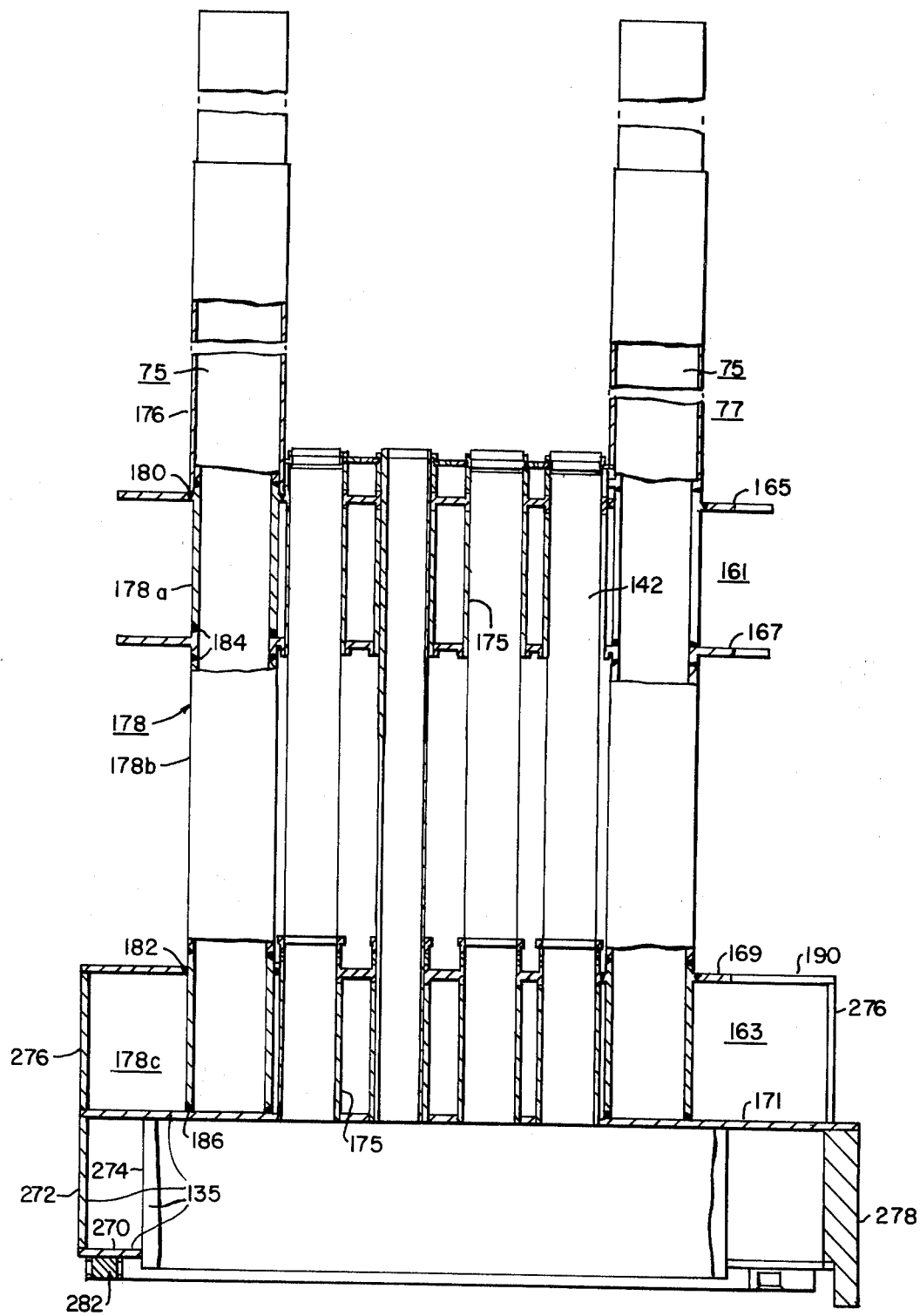
FIG. 7 is a view in section taken along lines VII—VII of FIG. 6.
Figure 8:
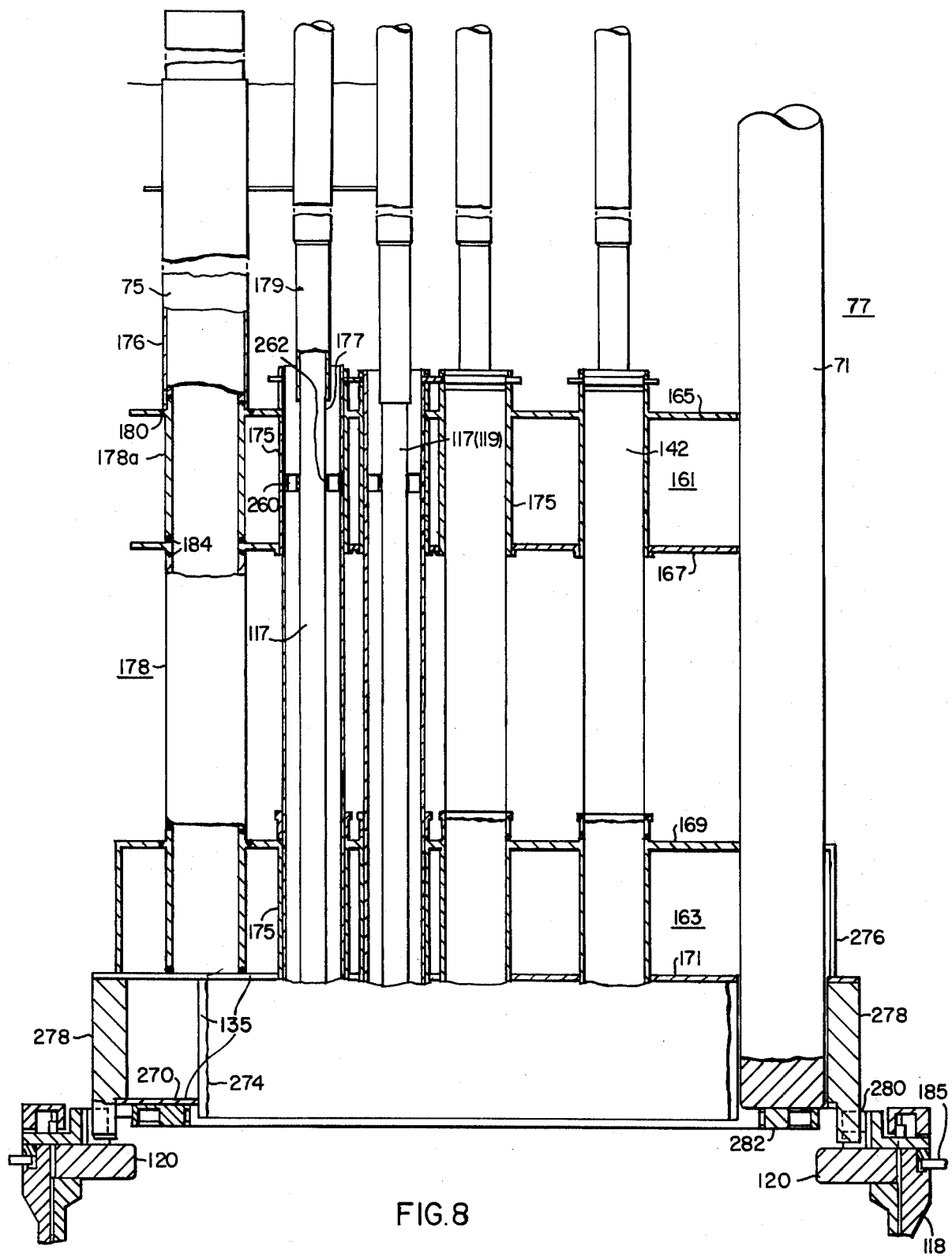
FIG. 8 is a view predominately in side elevation but partly in section showing the upper internals of the reactor shown in FIGS. 1A and 1B.
Figure 12A:
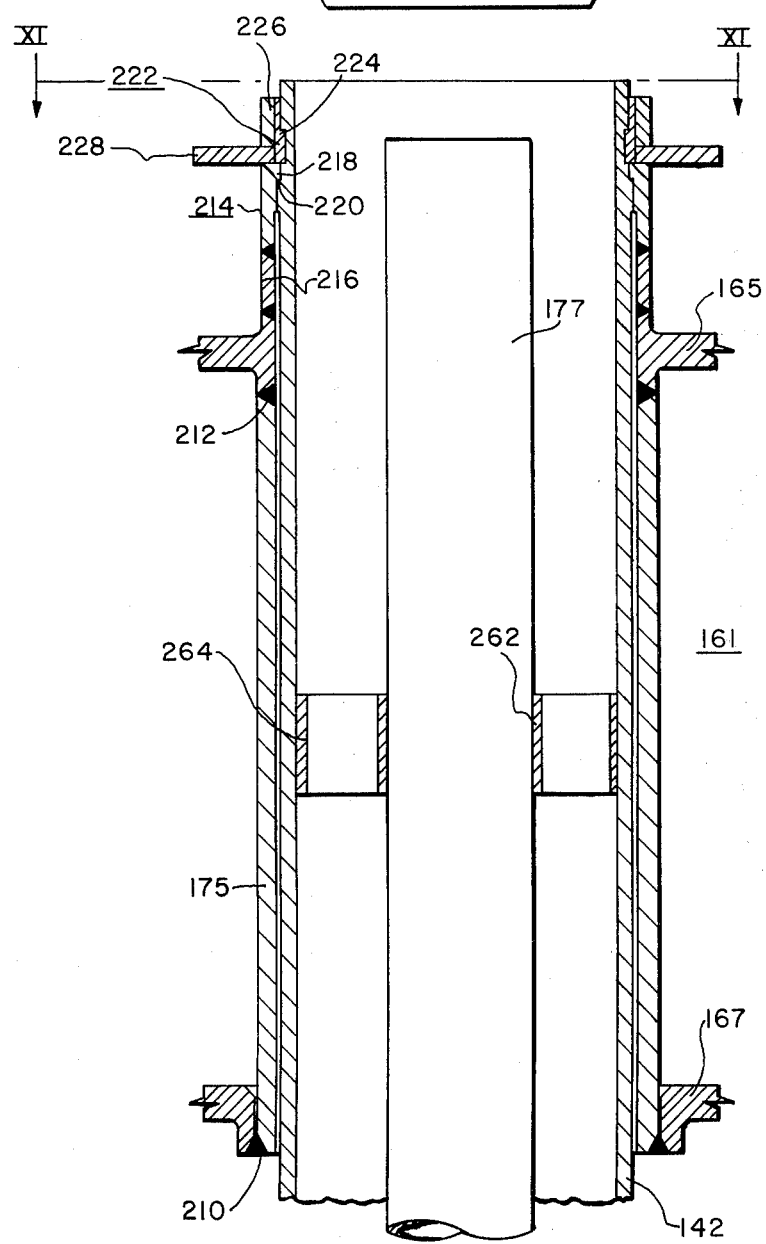
Figure 13:
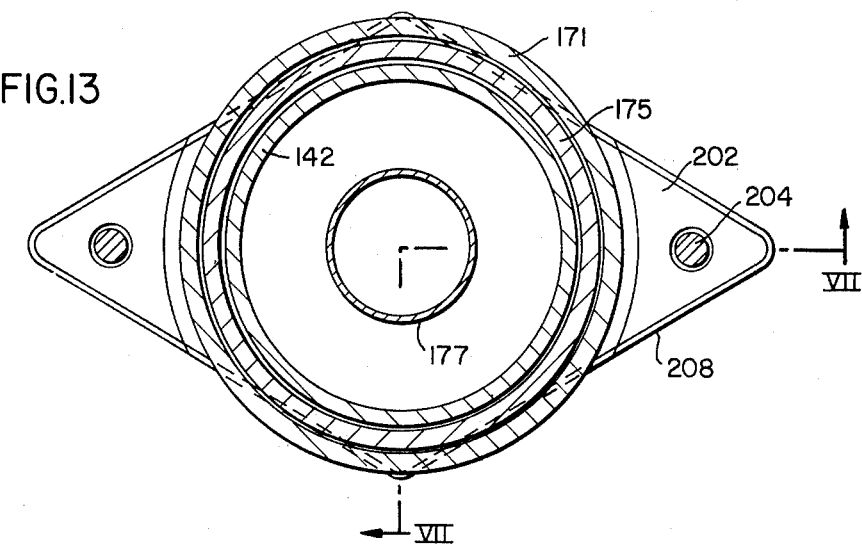
FIGS. 13, 14, 15, 16 and 17 are view in transverse section taken along lines XIII—XIII, XIV—XIV, XV—XV, XVI—XVI amd XVII—XVII respectively of FIG. 12.
Figure 14:
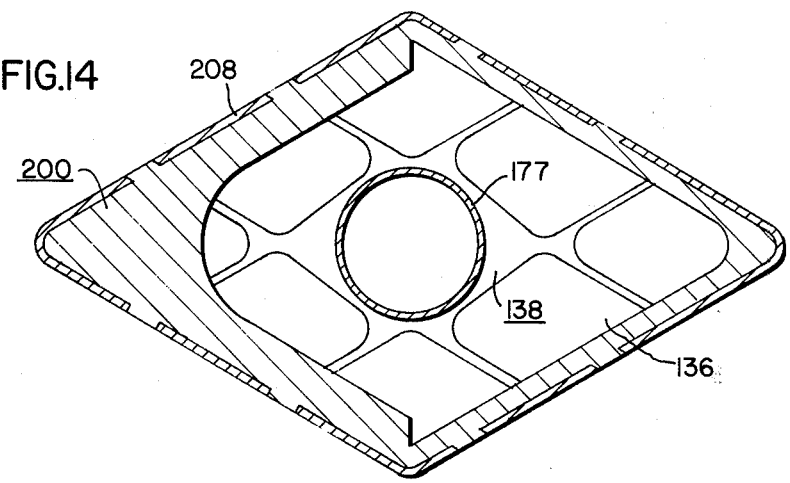
Figure 15:
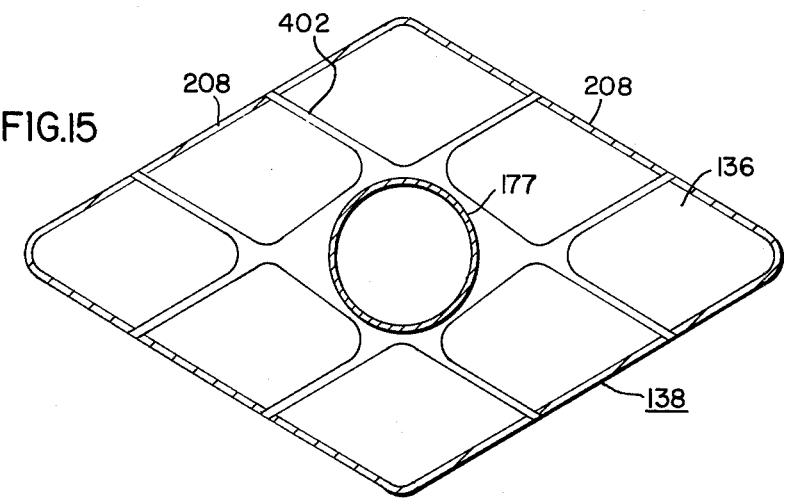
Figure 17:
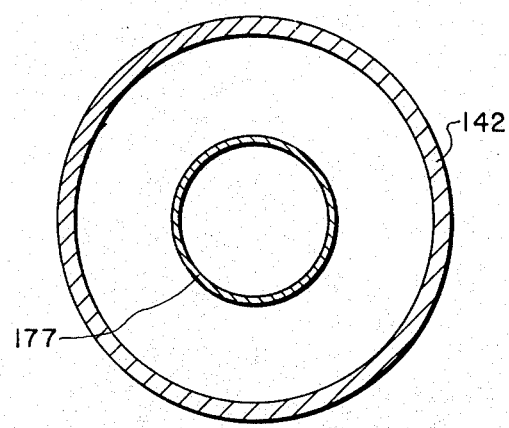
Figure 16:
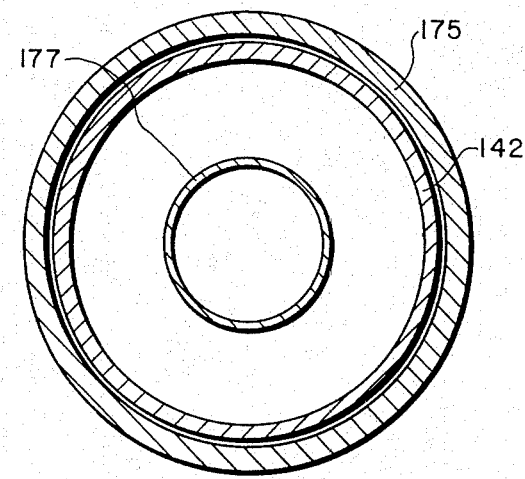

The main body of the load-bearing structure of the upper internals 77 is a weldment (FIGS. 6, 7, 8) of stainless steel (316). This weldment includes the columns 75 and a plurality of pairs 161 and 163 of plates, which may be described as sandwich plates, and which include the plates 165, 167, 169, 171. Stub tubes 175 are welded to the plates 165 and 167 and 169 and 171 of each pair 161 and 163 by circumferential welds 210 and circumferential butt welds 212 (FIG. 12). The stub tubes 175 serve as shear webs for the pairs of plates 161 and 163. The columns 75 are also welded to the plates 165 to 171. In addition there are ribs 450 between each column 75 and its adjacent stub tubes 175a and 175b. The ribs 450 are welded to the columns 75, the sandwich plates 165 and 167 and 169 and 171 and to the stub tubes. Above the upper plate 165 each column 75 is provided with a liner or sleeve 176 which is welded to an inner shell 178. The inner shell 178 is in abutting sections 178a, 178b, 178c welded around their abutting peripheries. Sections 178a and 178c are forgings while sections 178 and 178b are pipes. The upper section 178a and the lowermost section 178c are welded to the upper plate 165 of pair 161 and to plate 169 of pair 163 by peripheral lateral welds 180 and 182. The plate 167 of the pair 161 is welded to the intermediate section 178b and to the upper section 178a by butt welds 184 and the lower plate 171 is welded to the lower section 178c by a butt weld 186. The plate 169 includes a penetration 190 (FIGS. 7 and 8) for the in-vessel transfer mechanism 71. The column 75, including the sleeves 176 and the shell 178, the plates 165, 167, 169 and 171 and the studs 175 are composed of stainless steel (typically 316).

Figure 6:
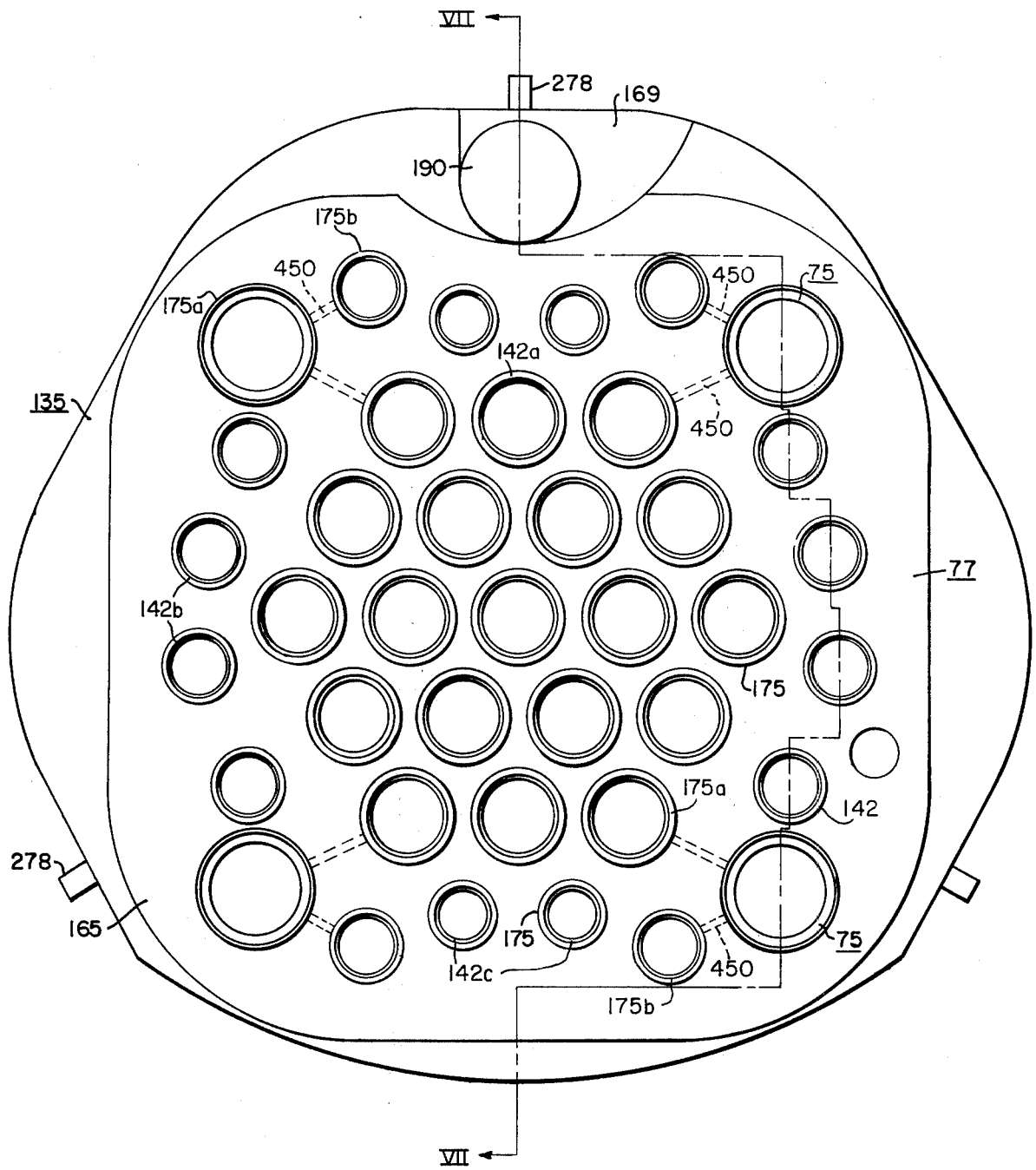
FIG. 6 is a plan view of the upper internals of the reactor shown in FIGS. 1A and 1B including the chimneys, the columns and the stub tubes.
Figure 9:
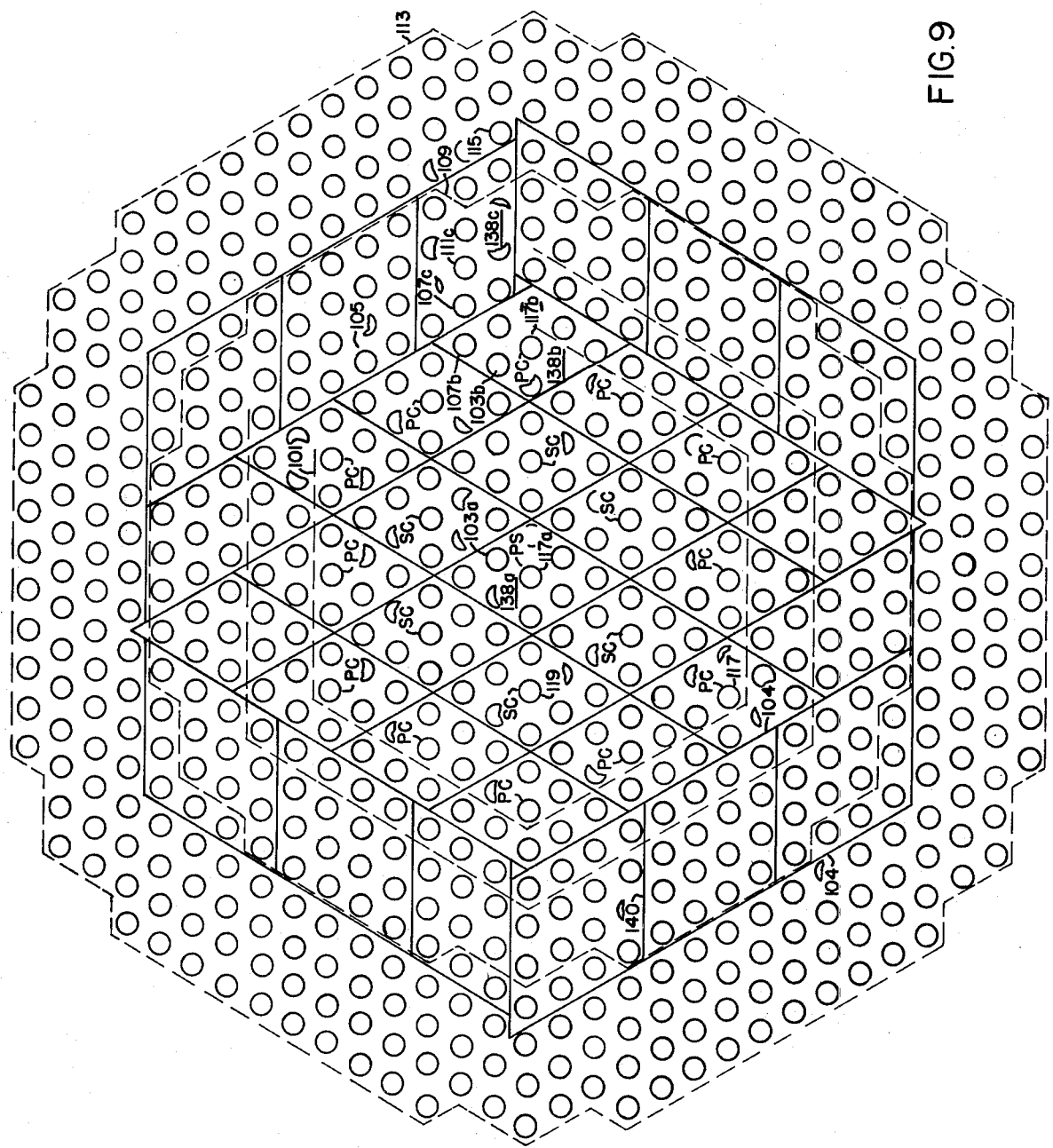
FIG. 9 is a diagrammatic plan view showing the relationship between the outlet modules and the core component assemblies of the reactor shown in FIGS. 1A and 1B.
Figure 11:
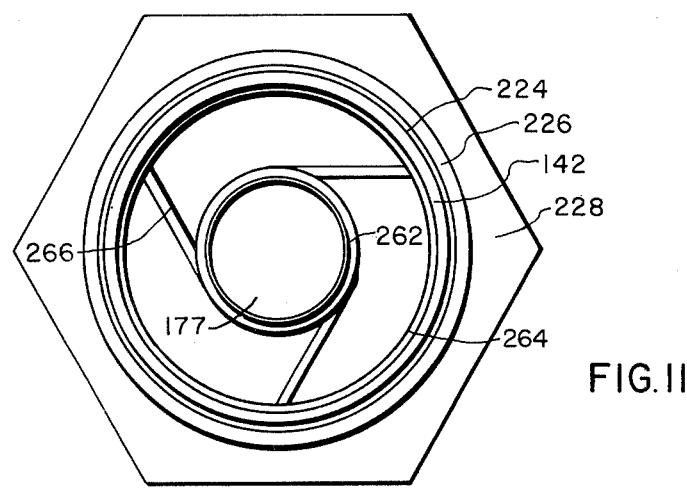
FIG. 11 is a plan view as seen from the direction XI—XI of FIG. 12 of this module.

The upper internals 77 includes a plurality of outlet modules 140 (FIGS. 5A, 5B, 10–18). These modules 140 are composed throughout of highly refractory nickel-chromium-iron alloy and are joined mechanically to the weldment 75-161-163-175. Each module 140 includes the grid 138, the flow collector 192, and the chimney 142. Each module 140 serves to direct the coolant streams from a plurality of core-component assemblies 103, 107, 117 and 119 into its associated chimney 142. Each grid 138 has the general appearance of an egg crate. FIG. 9 shows the disposition of the grids 138. Typically there are twenty-one grids 138, each receiving the coolant from nine core-component assemblies, ten grids each receiving the coolant from sixteen assemblies, and four grids each receiving the coolant from twelve assemblies; thirty-five grids in all. The outlet modules 140 and their chimneys are of different dimensions (FIG. 6). The chimneys 142a for modules including control assemblies have the greatest diamter, (about 10 inches inside diameter). The chimneys 142b for modules including 12 and 16 assemblies have intermediate diameters (about 7½ inches inside diameter) and the chimneys 142c for the remaining modules have the smallest diameter 16 ⅜ inches. The effluent from the radial shielding zone 113 is not channeled. It is emphasized that each grid 138 channels streams of widely different temperature into its associated chimney 142. Typically the central grid 138a channels relatively cool effluent from control rod 117a and the relatively hot effluent from fuel rods 103a. Another grid 138b channels relatively cool effluent from control rod 117b, hot fluid from the lowerenriched fuel rod 103b and still hotter fluid from the more highly enriched control rod 107b. Peripheral grid 138c channels fluid from fuel rods 107c and cooler fluid from fertile rods 111c. The effluent through the shielding rods 115 is cool and requires no channeling.

The outlet modules 140 including the associated chimneys 142 are composed of highly refractory nickel-chromium-iron alloy (typical INCONEL-718). Each module 140 (FIGS. 10-18) includes in addition to the grid 138 a transition member 200 to effect the transition between the diamond configuration of the grid and the circularly-cylindrical configuration of the chimney 142. The grid 138 and the transition member 200 are enclosed in a shell 208 (of INCONEL-718) which is secured to these members by welding. At the top the transition member 200 has a shoulder 202 which extends along the lower plate 171. Rotation of the transition member 200 relative to the weldment 75-161-163-175 is prevented by a pin 204 which extends from plate 171 and engages member 200. The grid 138 and the transition member 200 also have projections 240 and 242 which engage the shell 208.

At the top the transition member 200 also has a lip 206 to which the chimney 142 is welded. The chimney 142 is encircled by, or housed in, the stub tubes 175 with which it is coaxial and which are composed of stainless steel. Since this alloy is not weld compatible with the refractory alloy, it is necessary that the chimney 142 by mechanically secured to the weldment 75-161-163-175.

To accomplish this urpose a circularly-cylindrical extension 214 (FIG. 12) of nickel-chromium-iron alloy (typically INCONEL-600) is welded to the end of the upper stub 175. This alloy is weld compatible with the stainless steel of the stub 175 and has about the same thermal coefficient of expansion as the refractory nickel-chromium-iron alloy of the chimney 142. The extension 214 is a close tolerance fit to the chimney and because the thermal coefficients of expansion are nearly the same, this fit is maintained in the face of fluctuations in temperature and flow-induced vibrations are suppressed.

The extension 214 is welded to another extension 216 of stainless steel which is itself welded to the plate 165. The purpose of this extension 216 is to space the extension 214 sufficiently from plate 165 to reduce local bending moments at operating temperatures to acceptable levels. The extension 214 has a ledge 218 at the top. The ledge 218 engages the chimney 142 in a shoulder 220. Above the extension 214 there is a key 222, which is in the form of a split ring, and which tightly engages the chimney near its top in a groove. The key 222 has a ledge 224 penetrating into the groove. The key 222 is composed of the same alloy (INCONEL718) and is held by a locking band 226 of the same alloy. A thermal liner 228 also of INCONEL 718 is held in place by the locking band 226. The mechanical joint 214-222-142 not only carries lateral loads but it also carries vertical loads both up and down. Up loads are carried by the ledge 218 of extension 216 and down loads by the ledge 224 of the key 222.

A lateral load pad is also provided between the lower stub 175 and the chimney 142. In this case an extension 230 of stainless steel is welded to the plate 169 and an extension 232 of the nickel-chromium-iron alloy which is weld compatible with the stainless steel and of the same thermal cofficient of expansion as the refractory alloy, is welded to the extension 230. The extension 232 is a close tolerance fit to the chimney 142.

Each opening 136 in the grid 138 has a socket for receiving the outlet nozzle (127 of duct 121 for the fuel rod assemblies) of the duct whose effluent is channeled through the opening (FIG. 10). FIG. 12 shows an opening 136 which receives the outlet nozzle 244 of the outer duct 260 of a control assembly. The control assembly also has an inner duct (not shown) which is movable through the outer duct. In this case the socket 246 is double ended.

The socket 246 is a shell of the refractory nickel-chromium-iron alloy wleded to the adjacent walls 248 of the grid 138. The shell 246 has a lower opening 250 to receive the nozzle 244. The shell also has an upper tapered opening 252 to receive the end 254 of a shell to which a flow tube 177 is attached. The end 256 of the flow tube 177 of seated in the rim of the shell 246. The shroud 179 (FIG. 1A) is attached to the flow tube 177. The shell 254 and the flow tube 177 are composed of the highly refractory alloy. The inner duct (not shown) of the control assembly is connected to a control assembly drive line 117 (FIG. 5A) and is movable along flow tube 177 and shroud 179. The flow tube is aligned or centered in the chimney 142 by coaxial rings 262 and 264 and spider 266 all composed of the refractor nickel-chromium-iron alloy.

The modules 140 are enclosed in a shroud 135 (FIGS. 7, 8) composed of stainless steel (316). The shroud 135 is formed of a top plate coextensive with the plate 171 of the pair 163, a bottom annular plate 270 and inner and outer annular plates 272 and 274. The plate 171 whose extension serves as top plate is connected to the upper plate 169 of sandwich 163 by an annular plate 276 of the refractory alloy which is welded to plates 169 and 171. The keys 278 of stainless steel (316) are secured at positions spaced about 120° around the periphery of the shroud 135 between the top plate 171 and the bottom plate 270. Each key 278 engages a keyway 280 secured to the assembly 456, 120, 454 which is keyed to the core barrel 118 (FIGS. 18, 19, 20, 21 and the core). The upper internals 77 is thus firmly supported through the columns 75 between and by the head plate 41 and the core barrel 118. In FIG. 1 a fragmentary section of the shroud 135 is shown in broken lines.

The core-component assemblies extend into the shroud. A peripheral seal 282 extends around the periphery of the core 93 between the core outlet and the shroud 135. The seal 282 includes a plurality of abutting blocks 284 which extend over the second and third rows, radially outwardly, of the removable shielding assemblies 115 (seeFIG. 18). The seal blocks 284 are secured to the bottom plate 270 of the shroud 135.

The lower internals 95 (FIG. 1B) is described in detail in the Pennell and Rylatt applications. The internals 95 include a plate 191 in the form of an inverted truncated cone which is welded integrally with the vessel 21. The core barrel 118 is welded to the periphery of the horizontal plate 193 of this support.

A liner 203 (FIGS. 1B) is slidably mounted in openings in the plate 193. The liner is of generally hollow cylindrical form. From the bottom of the liner 203 a flow-distribution and blockage-prevention disc 205 is suspended into the inlet plenum 25. The liner 203 is suspended from the top of plate 193 by a collar 207 which is screwed into and welded to the liner 203 and engages the plate 193 along a recess about the corresponding opening in plate 193.

An inlet modular unit 221 is removably mounted in each of the liners 203. The modular unit 221 may be of different types and the type which is mounted in a liner 203 in any position of plate 193 depends on the purpose which it is to serve. Some units 221 receive fuel assemblies 103 or 107 or control-rod assemblies 117 or 119 which require high fluidcooling flow; other units receive blanket assemblies 111 or removable shielding assemblies 115. Assemblies 103, 107, 117 or 119 are plugged into the inlet modules 21. Each assembly, as the case may be, has a greater specific gravity than the coolant fluid. Because the pressure above and below the assembly is balanced, the assembly remains in its receptacle under its own weight. The inlet modules 221 are mounted in the liners 203 in seals so that the pressure above and below the modules 221 is balanced. Leakage through the seals is carried to the outer region of the vessel 21 through the vent pipes 275.

While a preferred embodiment has been disclosed herein, many modifications thereof are feasible. This invention is not to be restricted except insofar as is necessitated by the spirit of the prior art.

We claim:

1. A liquid metal cooled nuclear reactor including a vessel, a head plate for said vessel, said vessel supporting a nuclear core therein including a plurality of vertically disposed core assemblies emitting coolant at different temperatures, said vessel also having inlet means below said core and outlet means above said core, and a low thermal inertia upper internals structure suspended above said core for channeling substantially all of said coolant from the top of said core to said outlet means, said suspended structure allowing said assemblies to rise vertically a preselected distance before interfering with said vertical rising, said upper internals structure comprising:
   a. a stainless steel weldment including:
      i. a plurality of vertically disposed elongated load bearing columns each affixed at its upper end to said head plate;
      ii. an upper pair of horizontally disposed parallel plates;
      iii. a plurality of upper stub tubes circumferentially welded to said upper plates;
      iv. a lower pair of horizontally disposed parallel plates;
      v. a plurality of lower stub tubes circumferentially welded to said lower plates, and
      vi. means for affixing the lower portion of each said column to said upper and lower plates;
   b. a plurality of outlet modules of a refractory corrosion resistant alloy, each said module having a flow collector disposed between said core and said weldment for collecting coolant emitted from a plurality of said assemblies, a cylindrical chimney, said chimney extending upwardly through a concentrically aligned lower stub tube and upper stub tube,
   c. means for mechanically affixing said chimney to said weldment, and
   d. a peripheral seal affixed to said weldment and extending about the outer periphery of said core for directing the bulk of said coolant from said assemblies into said collectors, said seal formed of a plurality of horizontally abutting blocks having a horizontal section and a plurality of vertical protrusions extending downwardly therefrom, said protrusions circumferentially surrounding the top of some of said assemblies so as to act as a core bundling device.

2. The liquid metal cooled nuclear reactor of claim 1 wherein said means for affixing each said column to said upper and lower plates comprise a plurality of ribs welded to said column and at least one of said upper plates and lower plates and further comprises a plurality of tubes concentrically aligned with and welded to said column and welded to said upper and lower plates.

3. The liquid metal cooled nuclear reactor of claim 1 wherein said chimney includes a circumferential groove about its periphery and an outwardly extending chimney ledge below said groove and wherein said means for mechanically affixing said chimney to said weldment are positioned above the uppermost of said upper plates and comprises a cylindrical first extension concentrically surrounding said chimney, said first extension being welded to said weldment and having a ledge for supporting a split ring key, said key tightly engaging said circumferential groove and being circumferentially surrounded by a locking band, said extension further having an inwardly extending shoulder below said groove, said shoulder overlapping said chimney ledge, whereby upwardly acting loads on said chimney are transmmitted to said weldment through said shoulder, and downwardly acting loads on said chimney are transmitted to said weldment through said key.

4. The liquid metal cooled nuclear reactor of claim 3 wherein said outlet modules are comprised of Inconel 718, said cylindrical extension is comprised of Inconel 600 and is welded to said weldment by a second extension comprised of stainless steel concentrically aligned with said first extension.

5. The liquid metal cooled nuclear reactor of claim 4 further comprising a thermal linear comprised of Inconel 718 disposed betweeen said top ledge of said first extension and said locking band and concentrically surrounding said chimney.

* * * * *